United States Patent
Wu et al.

(10) Patent No.: US 9,727,615 B2
(45) Date of Patent: *Aug. 8, 2017

(54) SHARING ITEM IMAGES BASED ON A SIMILARITY SCORE

(71) Applicant: eBay Inc., San Jose, CA (US)

(72) Inventors: Xiaoyuan Wu, Shanghai (CN); Alvaro Bolivar, San Francisco, CA (US); Qiang Wang, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,843

(22) Filed: Nov. 24, 2015

(65) Prior Publication Data

US 2016/0078098 A1    Mar. 17, 2016

Related U.S. Application Data

(63) Continuation of application No. 14/254,740, filed on Apr. 16, 2014, now Pat. No. 9,229,954, which is a continuation of application No. 12/192,625, filed on Aug. 15, 2008, now Pat. No. 8,818,978.

(51) Int. Cl.
*G06F 17/30* (2006.01)
*G06Q 30/02* (2012.01)
*G06Q 30/06* (2012.01)

(52) U.S. Cl.
CPC .... *G06F 17/30528* (2013.01); *G06F 17/3053* (2013.01); *G06F 17/30247* (2013.01); *G06Q 30/0283* (2013.01); *G06Q 30/0643* (2013.01)

(58) Field of Classification Search
CPC ......... G06F 17/30528; G06F 17/30247; G06F 17/3053
See application file for complete search history.

(56) References Cited

U.S. PATENT DOCUMENTS

| 5,749,081 A | 5/1998 | Whiteis |
| 5,845,265 A | 12/1998 | Woolston |
| 6,266,651 B1 | 7/2001 | Woolston |

(Continued)

OTHER PUBLICATIONS

"U.S. Appl. No. 12/145,313, Advisory Action mailed Feb. 21, 2012", 3 pgs.

(Continued)

*Primary Examiner* — Noosha Arjomandi
(74) *Attorney, Agent, or Firm* — Schwegman Lundberg & Woessner, P.A.

(57) ABSTRACT

Techniques for sharing item images based on a similarity score are described. For example, a machine receives an input item listing for an item from a user device. The machine accesses an existing image that may be associated with one or more existing item listings. The machine identifies a degree of similarity between the input item listing and the one or more existing item listings. The machine generates a similarity score for the existing image based on the degree of similarity. The machine selects one or more existing images corresponding to the one or more existing item listings based on the one or more existing images having corresponding similarity scores that exceed a threshold value. The machine transmits a communication to the user device in response to the receiving of the input item listing. The communication may include the one or more existing images.

17 Claims, 7 Drawing Sheets

(56) References Cited

U.S. PATENT DOCUMENTS

| | | | |
|---|---|---|---|
| 6,529,892 B1* | 3/2003 | Lambert | G06F 17/2725 706/20 |
| 6,973,663 B1* | 12/2005 | Brown | G06F 3/0482 348/E7.06 |
| 7,003,503 B2 | 2/2006 | Crosby et al. | |
| 7,444,388 B1 | 10/2008 | Svendsen | |
| 7,478,113 B1 | 1/2009 | De Spiegeleer et al. | |
| 7,779,263 B2 | 8/2010 | Kanai | |
| 7,813,965 B1 | 10/2010 | Robinson et al. | |
| 7,991,790 B2 | 8/2011 | Barker et al. | |
| 8,645,391 B1* | 2/2014 | Wong | G06F 17/30908 707/748 |
| 8,818,978 B2 | 8/2014 | Wu et al. | |
| 9,229,954 B2 | 1/2016 | Wu et al. | |
| 9,607,014 B2* | 3/2017 | Wang | G06F 17/30265 |
| 2002/0055932 A1 | 5/2002 | Wheeler et al. | |
| 2002/0087404 A1 | 7/2002 | Silkey et al. | |
| 2002/0169764 A1* | 11/2002 | Kincaid | G06F 17/30713 |
| 2004/0151860 A1* | 8/2004 | Shah | B42D 5/003 428/40.1 |
| 2005/0060643 A1 | 3/2005 | Glass et al. | |
| 2005/0234888 A1* | 10/2005 | Bailey | G06F 17/30398 |
| 2006/0059116 A1 | 3/2006 | Levi et al. | |
| 2006/0124730 A1 | 6/2006 | Maloney | |
| 2006/0155764 A1* | 7/2006 | Tao | G06F 17/30867 |
| 2006/0218522 A1* | 9/2006 | Hanechak | G06F 17/30265 717/105 |
| 2006/0251338 A1* | 11/2006 | Gokturk | G06F 17/30253 382/305 |
| 2006/0253578 A1 | 11/2006 | Dixon et al. | |
| 2007/0030364 A1 | 2/2007 | Obrador et al. | |
| 2007/0043757 A1 | 2/2007 | Benton et al. | |
| 2007/0078726 A1 | 4/2007 | MacDonald Korth et al. | |
| 2007/0106618 A1* | 5/2007 | Wu | G06Q 20/382 705/64 |
| 2007/0136255 A1 | 6/2007 | Rizzo et al. | |
| 2007/0150368 A1 | 6/2007 | Arora et al. | |
| 2007/0174341 A1 | 7/2007 | Saripalli et al. | |
| 2007/0239778 A1* | 10/2007 | Gallagher | G06F 17/30244 |
| 2007/0288433 A1 | 12/2007 | Gupta et al. | |
| 2008/0073423 A1 | 3/2008 | Heit et al. | |
| 2008/0091692 A1 | 4/2008 | Keith et al. | |
| 2008/0154958 A1* | 6/2008 | Sloo | G06F 17/30855 |
| 2008/0208855 A1 | 8/2008 | Lingenfelder et al. | |
| 2008/0235216 A1* | 9/2008 | Ruttenberg | G06Q 30/02 |
| 2008/0243878 A1 | 10/2008 | De Spiegeleer et al. | |
| 2008/0243879 A1 | 10/2008 | Gokhale et al. | |
| 2008/0243957 A1 | 10/2008 | Prahlad et al. | |
| 2008/0312142 A1* | 12/2008 | Nakao | A61K 38/2242 514/1.1 |
| 2008/0313142 A1 | 12/2008 | Wang et al. | |
| 2009/0012991 A1 | 1/2009 | Johnson et al. | |
| 2009/0024564 A1 | 1/2009 | Green et al. | |
| 2009/0141932 A1 | 6/2009 | Jones et al. | |
| 2009/0148052 A1 | 6/2009 | Sundaresan | |
| 2009/0193123 A1 | 7/2009 | Mitzlaff et al. | |
| 2009/0224941 A1 | 9/2009 | Kansal et al. | |
| 2009/0265229 A1 | 10/2009 | Sidhu | |
| 2009/0307113 A1 | 12/2009 | Fasold et al. | |
| 2009/0307296 A1 | 12/2009 | Gibbs et al. | |
| 2009/0319570 A1 | 12/2009 | Subramanian | |
| 2010/0042422 A1 | 2/2010 | Summers | |
| 2010/0042609 A1 | 2/2010 | Wu et al. | |
| 2011/0106851 A1* | 5/2011 | Swartz | G06Q 30/0603 707/780 |
| 2013/0173370 A1 | 7/2013 | Schory et al. | |
| 2013/0275269 A1* | 10/2013 | Chen | G06Q 30/0639 705/26.62 |
| 2014/0229494 A1* | 8/2014 | Wu | G06F 17/30247 707/749 |
| 2016/0189011 A1* | 6/2016 | Bhardwaj | G06Q 30/0643 382/155 |

OTHER PUBLICATIONS

"U.S. Appl. No. 12/145,313, Advisory Action mailed Apr. 21, 2011", 3 pgs.

"U.S. Appl. No. 12/145,313, Appeal Brief filed Mar. 18, 2013", 28 pgs.

"U.S. Appl. No. 12/145,313, Decision on Pre-Appeal Brief mailed Jan. 18, 2013", 2 pgs.

"U.S. Appl. No. 12/145,313, Examiner Interview Summary mailed Mar. 1, 2012", 3 pg.

"U.S. Appl. No. 12/145,313, Examiner's Answer mailed May 15, 2013", 5 pgs.

"U.S. Appl. No. 12/145,313, Final Office Action mailed Mar. 15, 2011", 36 pgs.

"U.S. Appl. No. 12/145,313, Final Office Action mailed Jul. 11, 2012", 50 pgs.

"U.S. Appl. No. 12/145,313, Final Office Action mailed Dec. 2, 2011", 43 pgs.

"U.S. Appl. No. 12/145,313, Non Final Office Action mailed Mar. 30, 2012", 49 pgs.

"U.S. Appl. No. 12/145,313, Non Final Office Action mailed Jun. 23, 2011", 40 pgs.

"U.S. Appl. No. 12/145,313, Non-Final Office Action mailed Oct. 6, 2010", 32 pgs.

"U.S. Appl. No. 12/145,313, Pre-Appeal Brief Request for Review filed Oct. 11, 2012", 4 pgs.

"U.S. Appl. No. 12/145,313, Reply Brief filed Jul. 15, 2013", 5 pgs.

"U.S. Appl. No. 12/145,313, Response filed Feb. 2, 2012 to Final Office Action mailed Dec. 2, 2011", 17 pgs.

"U.S. Appl. No. 12/145,313, Response filed Mar. 1, 2012 to Advisory Action mailed Feb. 21, 2012 and Final Office Action mailed Dec. 2, 2011", 19 pgs.

"U.S. Appl. No. 12/145,313, Response filed Jun. 15, 2011 to Advisory Action mailed Apr. 21, 2011 abd Final Office Action mailed Mar. 15, 2011", 17 pgs.

"U.S. Appl. No. 12/145,313, Response filed Jul. 2, 2012 to Non Final Office Action mailed Mar. 30, 2011", 14 pgs.

"U.S. Appl. No. 12/145,313, Response filed Sep. 15, 2011 too Non Final Office Action mailed Jun. 23, 2011", 16 pgs.

"U.S. Appl. No. 12/145,313, Response filed Jan. 6, 2011 to Non Final Office Action mailed Oct. 6, 2010", 20 pgs.

"U.S. Appl. No. 12/145,313, Response filed Apr. 8, 2011 to a Final Office Action mailed Mar. 15, 2011", 22 pgs.

"U.S. Appl. No. 12/192,625 , Response filed Oct. 25, 2011 to Final Office Action mailed Aug. 25, 2011", 18 pgs.

"U.S. Appl. No. 12/192,625 , Response filed Nov. 17, 2011 to Advisory Action mailed Nov. 2, 2011 and Final Office Action mailed Aug. 25, 2011", 18 pgs.

"U.S. Appl. No. 12/192,625 , Response filed Dec. 11, 2013 to Final Office Action mailed Sep. 11, 2013", 18 pgs.

"U.S. Appl. No. 12/192,625, Advisory Action mailed Nov. 2, 2011", 2 pgs.

"U.S. Appl. No. 12/192,625, Final Office Action mailed Aug. 25, 2011", 16 pgs.

"U.S. Appl. No. 12/192,625, Final Office Action mailed Sep. 11, 2013", 35 pgs.

"U.S. Appl. No. 12/192,625, Non Final Office Action mailed Mar. 1, 2013", 35 pgs.

"U.S. Appl. No. 12/192,625, Non Final Office Action mailed Apr. 28, 2011", 15 pgs.

"U.S. Appl. No. 12/192,625, Notice of Allowance mailed Jan. 31, 2014", 21 pgs.

"U.S. Appl. No. 12/192,625, Preliminary Amendment filed Aug. 15, 2008", 3 pgs.

"U.S. Appl. No. 12/192,625, Response filed May 30, 2013 to Non Final Office Action mailed Mar. 1, 2013", 18 pgs.

"U.S. Appl. No. 12/192,625, Response filed Jun. 16, 2011 to Non Final Office Action mailed Apr. 28, 2011", 17 pgs.

"U.S. Appl. No. 14/254,740, Final Office Action mailed Mar. 19, 2015", 17 pgs.

"U.S. Appl. No. 14/254,740, Non Final Office Action mailed Nov. 18, 2014", 16 pgs.

(56) References Cited

OTHER PUBLICATIONS

"U.S. Appl. No. 14/254,740, Notice of Allowance mailed Aug. 26, 2015", 17 pgs.
"U.S. Appl. No. 14/254,740, Response filed Feb. 18, 2015 to Non Final Office Action mailed Nov. 18, 2014", 15 pgs.
"U.S. Appl. No. 14/254,740, Response filed Jul. 20, 2015 to Final Office Action mailed Mar. 19, 2015", 14 pgs.
"U.S. Appl. No. 14/254,740. Preliminary Amendment filed Apr. 23, 2014", 10 pgs.
U.S. Appl. No. 14/254,740, filed Apr. 16, 2014, Sharing Item Images Based on a Similarity Score.
U.S. Appl. No. 12/145,313, filed Jun. 24, 2008, Consolidating Duplicate Item Images Using an Image Identifier.

\* cited by examiner

| SERIAL NUMBER | TITLE | TAGS (E.G., DESCRIPTIONS) | | | | LISTING PERIOD | IMAGE IDENTIFIER |
|---|---|---|---|---|---|---|---|
| | | COLOR | SITE | • • • | STATUS | | |
| #1 | | 632 | 634 | | 636 | | |

*FIG. 6*

SHARING ITEM IMAGES BASED ON A SIMILARITY SCORE

CROSS REFERENCE TO RELATED APPLICATIONS

The present application is related to U.S. Non-Provisional patent application Ser. No. 12/145,313 entitled "CONSOLIDATING DUPLICATE ITEM IMAGES USING AN IMAGE IDENTIFIER" that was filed on Jun. 24, 2008 and which is incorporated by reference herein in its entirety.

The present application is a continuation of and claims the benefit of priority under 35 U.S.C. §120 to U.S. patent application Ser. No. 12/192,625 entitled "SHARING ITEM IMAGES USING A SIMILARITY SCORE," filed on Aug. 15, 2008, and to U.S. patent application Ser. No. 14/254,740 entitled "SHARING ITEM IMAGES BASED ON A SIMILARITY SCORE," filed on Aug. 16, 2014, which are hereby incorporated by reference herein in their entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright© 2008-2015, eBay Inc. All Rights Reserved.

TECHNICAL FIELD

Example embodiments relate generally to the technical field of algorithms and programming and, in an example, to uploading item listings and associating the item listings with images.

BACKGROUND

Typically, when a new item listing is added to an online transaction (e.g., auction, sale, etc.) system, such as eBay, an image corresponding to the new item listing is also uploaded to the online transaction system and associated with the item listing. This increases the number of images maintained in the online transaction system in proportion to the number of item listings. The increased number of images, in turn, increases the amount of memory required to maintain the item listings. Currently, for example, e-Bay maintains more than one billion item images and the number increases as new item listings are added every day. Many item listings listed on eBay are, however, identical or substantially similar to one another. This results in many identical or substantially similar item images being loaded and piled up repeatedly, causing an inefficient use of memory and a delayed response in a search for a wanted item listing.

BRIEF DESCRIPTION OF THE DRAWINGS

Some embodiments are illustrated by way of example and not limitation in the figures of the accompanying drawings in which:

FIG. 6 is a diagram illustrating a data structure for an item listing in accordance with an example embodiment.

DETAILED DESCRIPTION

In some example embodiments, a system and method are illustrated to associate an item listing with one or more corresponding images. The system and method include receiving an item listing for an item from a user device. The item listing may include a title, a category and one or more tags for the item. A respective tag may include a pair of an attribute of the item and a value for the attribute. The system and method include generating a similarity score for a respective existing image associated with one or more existing item listings. The generating may include comparing the item listing received from the user device with the existing item listings. The similarity score may indicate a degree of similarity between the item listing and the existing item listings associated with the respective existing image. The system and method include proposing a specified number of existing images that have the highest similarity scores to the user device. The system and method further include associating the item listing received from the user device with one or more of the specified number of existing images accepted by the user device.

In some example embodiments, a system and method are illustrated to select one or more item images for an item listing. The system and method include transferring an item listing provided by a user to a host device. The system and method include downloading a specified number of existing images from the host device. The specified number of existing images may be images proposed by the host device in response to a receipt of the item listing transferred to the host device. The system and method include presenting the specified number of existing images to the user. The presenting may include displaying a respective proposed existing image along with its corresponding similarity score. The similarity score may indicate a degree of similarity between the item listing transferred to the host device and one or more item listings existing in the host device. The system and method include receiving an acceptance of one or more of the specified number of existing images from the user. The system and method further include communicating the acceptance to the host device. More detailed explanation about the use of the similarity score to share images among item listings is given below using FIGS. 1-7.

Figure 1:
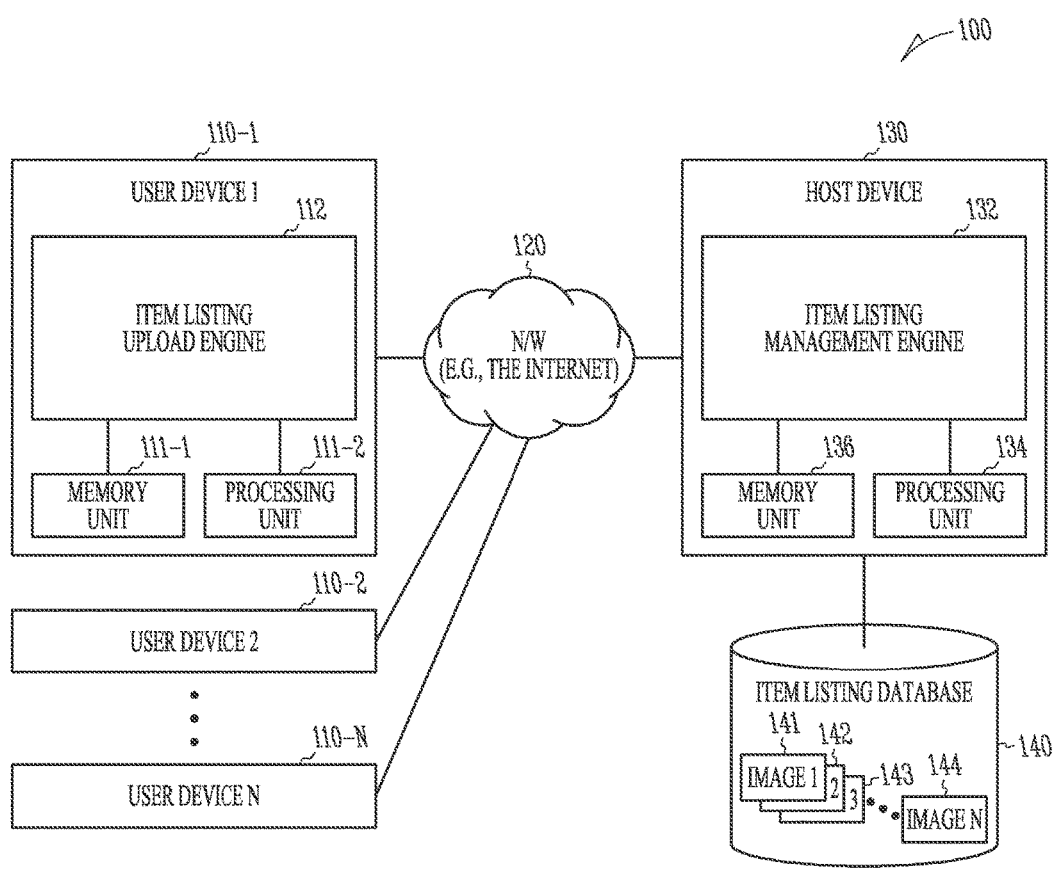
FIG. 1 is a diagram of a computer system for uploading and managing item listings in accordance with an example embodiment.

FIG. 1 is a diagram of a computer system for uploading and managing item listings 100 in accordance with an example embodiment. Illustrated in FIG. 1 are user devices 110-1 through 110-N, a network 120, a host device 130 and item listing database 140. Each user device (e.g., 110-1) may be, for example, a personal computer (PC), a cell phone or a personal digital assistant (PDA), and have an item listing upload engine 112, a memory unit 111-1 and a processing unit 111-2. Although descriptions are given only for the item listing upload engine 112, the memory unit 111-1 and the processing unit 111-2 of the user device 1 (110-1), it is noted that each of the other user devices (e.g., user device 2 (110-2) through user device N (110-N)) may have corresponding elements with the same functionality.

The item listing upload engine 112 may receive an item listing for an item and/or an image for the item listing from a user (not shown in FIG. 1). The item may be a good (e.g., iPod Nano) or service (e.g., golf lesson) that may be transacted (e.g., exchanging, sharing information about, buying, selling, making a bid, etc.). The item listing for the item may be a detailed description for the item including a title, category (e.g., electronics, sporting goods, books, antiques, etc.) and other tag information. A tag may be a pair of an attribute of the item listing and a value of the attribute (e.g., 'color=red', 'size=30 Giga byte' or 'period of use=1 year' (if the item is a used item), etc.). The item listing may further include a listing period for the item listing to be displayed. The item listing may be associated with an item image via an image identifier in the host device 130. More detailed explanation about a data structure of the item listing is given below using FIG. 8.

The memory unit 111-1 may store the item listing and the image for the item listing received from the user for further processing by the processing unit 111-2. If the item listing and/or the image for the item listing are provided by the user, the item listing upload engine 112 may transfer (e.g., upload) both the item listing and the image for the item listing to the host device 130 via the network 120. The network 120 may be the Internet, Local Area Network (LAN), Wide Area Network (WAN) or any of other suitable networks. In some example embodiments, the image for the item listing may not be transferred to the host device 130. More detailed explanation about the item listing upload engine 112 is given below using FIG. 3.

The host device 130 may run an item listing management engine 132, a memory unit 136 and a processing unit 134. The item listing management engine 132 may receive the item listing for the item from any of the user devices 110-1 through 110-N. The memory unit 136 may store the received item listing and/or the received image for the item listing for further processing by the processing unit 134. The item listing management engine 132 may then generate a similarity score for a respective existing image in the host device 130 by, for example, comparing the item listing received from the user device (e.g., 110-1) with one or more existing item listings associated with the respective existing image. The item listing management engine 132 may then propose a specified number of existing images having the highest similarity scores to the user device (e.g., 110-1) that transfers the item listing to the host device 130. The item listing management engine 132 may further associate the item listing received from the user device (110-1) with one or more of the specified number of existing images that are accepted by the user via the user device (110-1). In some example embodiments, one or more existing item images 141, 142, 143 and 144 may reside in an item listing database 140, which may be operatively coupled to the host device 130 locally, or remotely via the network 120 or a distinct network (not shown in FIG. 1). More detailed explanation about the item listing management engine 132 is given below using FIG. 2.

Figure 2:
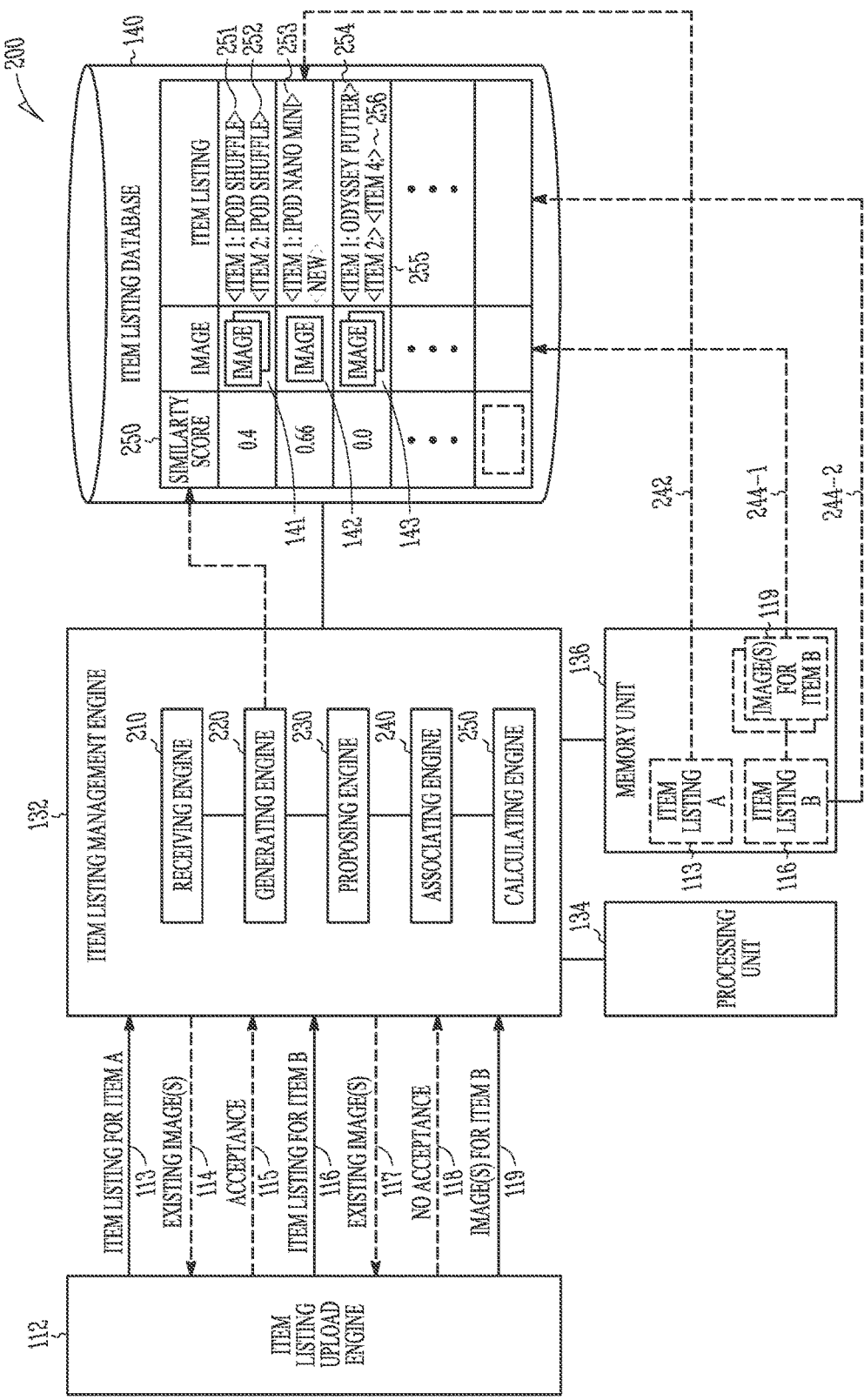
FIG. 2 is a diagram of a computer system for managing item listings in accordance with an example embodiment.

FIG. 2 is a diagram of a computer system for managing item listings 200 in accordance with an example embodiment. Illustrated in FIG. 2 are the item listing upload engine 112, the item listing management engine 132 operatively coupled with the processing unit 134 and the memory unit 136, and the item listing database 140 having an item listing table 260 therein. The item listing table 260 may have one or more existing images 141-143 and each of the existing images 141-143 may be associated with one or more existing item listings. For example, items 251 and 252 are associated with the existing image 141. More detailed explanation about the data structure of an item listing is given below using FIG. 6. Item listings (e.g., an item listing for item A 113 and an item listing for item B 116) and some or all images associated with the item listings (e.g., one or more images for the item B 119) may be uploaded from the item listing upload engine 112 to the item listing management engine 132. More detailed explanation about the item listing upload engine 112 is given below using FIG. 3. In some example embodiments, the item listings 113, 116 and the corresponding images (e.g., the images for the item B 119) may be stored in the memory unit 136 for further processing by the processing unit 134.

The item listing management engine 132 may include a receiving engine 210, a generating engine 220, a proposing engine 230 and an associating engine 240. As an illustrative example, the receiving engine 210 may receive the item listing for the item A 113 uploaded from the item listing upload engine 112 as an input item listing. In response to the receipt, the generating engine 220 may generate a similarity score for a respective existing image as compared to the item listing for the item A 113. The similarity score may be a non-negative real value and indicate a degree of similarity between the input item listing (e.g., the item listing for the item A 113) and one or more existing item listings associated with the respective existing image. The generating engine 220 may, therefore, calculate the similarity score by comparing the input item listing (e.g., the item listing for the item A 113) with the one or more existing item listings associated with the respective existing image.

In some example embodiments, to generate the similarity score, the generating engine 220 may calculate three separate sub-similarity scores: a title similarity score, a category similarity score and a tag similarity score. The title similarity score may indicate a degree of similarity between a title of the input item listing (e.g., the item listing for the item A 113) and titles of the one or more existing item listings associated with the respective existing image. In some example embodiments, the generating engine 220 may calculate the title similarity score by counting the number of terms in any of the titles of the one or more existing item listings that match a respective term in the title of the input item listing. For example, if two terms out of five terms included in the titles of the existing item listings match terms included in the title of the input item listing, then the generating engine 220 may assign 0.4 or 40% as the title similarity score for the respective existing image. For example, if the input item listing (e.g., the item listing for the item A 113) is titled as 'iPod Nano,' the title similarity score for an existing image 141 may be calculated to be 0.5 or 50%. That is because only two terms (e.g., iPod, iPod) out of the total four terms in the titles of the existing item listings (e.g., item 251 ('iPod Shuffle') and item 252 ('iPod Shuffle')) associated with the existing image 141 match terms in the title of the input item listing. Likewise, the title similarity score for an existing image 142 may be calculated to be 0.66 or 66%. In this example, two terms (e.g., iPod, Nano) out of the total three terms in the title of the existing item listing (e.g., item 253 ('iPod Nano Mini')) associated with the existing image 142 match the terms in the title of the input item listing. Applying the same method, the title similarity score for existing images 143 may be calculated to be 0.0 or 0% because none of the terms in the titles of corresponding existing item listings (e.g., items 254, 255, 256) associated with the existing image 143 matches the terms (e.g., iPod, Nano) in the input item listing.

The category similarity score may indicate a degree of similarity between a category of the input item listing and categories of the one or more existing item listings associated with the respective existing image. In some example embodiments, the input item listing may not be associated with an existing image if the category of the input item listing is different from a category of an existing item listing associated with the existing image. In such a case, entire existing item listings associated with the existing image may have the same category. The generating engine 220 may assign a specified numerical value that indicates whether the category of the one or more existing item listings matches the category of the input item listing (e.g., assigning +1 or 100% if the category matches and 0 or 0% otherwise).

The tag similarity score may indicate a degree of similarity between one or more tags of the input item listing and tags of the one or more existing item listings associated with the respective existing image. In some example embodiments, each tag (e.g., a pair of an attribute name and a value thereof) may be considered as a term. In such a case, the generating engine 220 may calculate the tag similarity score in a way similar to that used to calculate the title similarity score. That is, the generating engine 220 may count the number of tags of the one or more existing item listings that match a respective tag in the input item listing. The tag similarity score may be a non-negative real number (e.g., 0.2) or a percentage value (e.g., 20%) that indicates the number of matching tags out of the total tags included in the one or more item listings associated with the respective existing image.

In some example embodiments, when all the three sub-similarity scores are calculated for the respective exiting image, the generating engine 220 may then generate the similarity score for the respective existing image by applying a mathematical function (e.g., adding) to the sub-similarity scores. In some example embodiments, the generating engine 220 may assign a weight to one or more of the three sub-similarity scores before applying the mathematical function to the sub-similarity scores. The weight for each sub-similarity score may be manually or automatically specified. In some example embodiments, statistical values regarding the use (e.g., clicking-on) of existing item listings may be used to determine the weight for each sub-similarity score. The generating engine 220 may, therefore, calculate the similarity score for the respective existing image by using such a formula as w1*Title Similarity+w2*Category Similarity+w3*Tag Similarity, wherein the w1, w2 and w3 are corresponding weights. In some example embodiments, instead of generating the similarity score for entire existing item listings, the generating engine 220 may further limit the number of existing images for which the similarity score is calculated. For example, the generating engine 220 may choose one of a plurality of predefined temporal ranges (e.g., within a week, a month, a year, etc.), or set a variable temporal range (e.g., between Jan. 1, 2007 and Dec. 31, 2007, etc.), to reduce the number of the existing item listings that need to be compared. Other suitable limitations, such as a keyword limitation (e.g., iPod) and/or a category limitation (e.g., MP3 player), may be also placed for such a purpose. In some example embodiments, the temporal range or other suitable limitations may be designated by the user and received via the item listing upload engine 112.

When the similarity scores for the existing images are generated, the proposing engine 230 may select a specified number of the existing images 114, 117 having the highest similarity scores (e.g., 142 and 141) from the item listing table 260 and propose them via the item listing upload engine 112 to a user who entered the input item listing. In some example embodiments, the proposing engine 230 may further receive a designation for the specified number from the user via the item listing upload engine 112. The specified number may be one. In such a case, a single existing image with the highest similarity score (e.g., 142) alone may be proposed to the user. In some example embodiments, the proposing engine 230 may further check whether a respective similarity score for the specified number of the existing images satisfies a predetermined threshold value (e.g., 0.7 or 70%) that might have been predefined to guarantee a minimum level of similarity between the input item listing and a corresponding existing image proposed to the user. In such a case, if none of the similarity scores for the existing item images proposed to the user satisfies the predefined threshold value, then the proposing engine 230 may further send a corresponding message to the user via the item listing upload engine 112.

If the user accepts 115 one or more of the specified number of existing images proposed to him, then the associating engine 240 may associate the input item listing (e.g., the item listing for item A 113) with the accepted existing images. In some example embodiments, the associating engine 240 may store 242 the input item listing associated with the accepted exiting images into the item listing table 260 as a new item listing for the corresponding existing images (e.g., 142). In some example embodiments, if the user does not accept 118 any of the specified number of existing images 117 proposed to him, then the associating engine 240 may further receive one or more images for item B 119 from the user via the item listing upload engine 112. The associating engine 240 may then associate the input item listing (e.g., the item listing for item B 116) with the one or more images for item B 119 received from the user. In some example embodiments, the associating engine 240 may store 244-1, 244-2 the input item listing (e.g., the item listing for item B 116) and its associated image(s) 119 received from the user into the item listing table 260 as a new row.

In some example embodiments, the item listing management engine 132 may further comprise a calculating engine 250 operatively coupled with the associating engine 240. The calculating engine 250 may calculate a fee for posting the input item listing (e.g., the item listing for item A 113 or the item listing for item B 116) based on the number of images associated with the input item listing. It is noted that each of the engines described above in FIG. 2 may be implemented by hardware (e.g., circuit), firmware, software or any combinations thereof. It is also noted that although each of the engines is described above as a separate module, the entire engines or some of the engines in FIG. 2 may be implemented as a single entity (e.g., module or circuit) and still maintain the same functionality.

Figure 3:
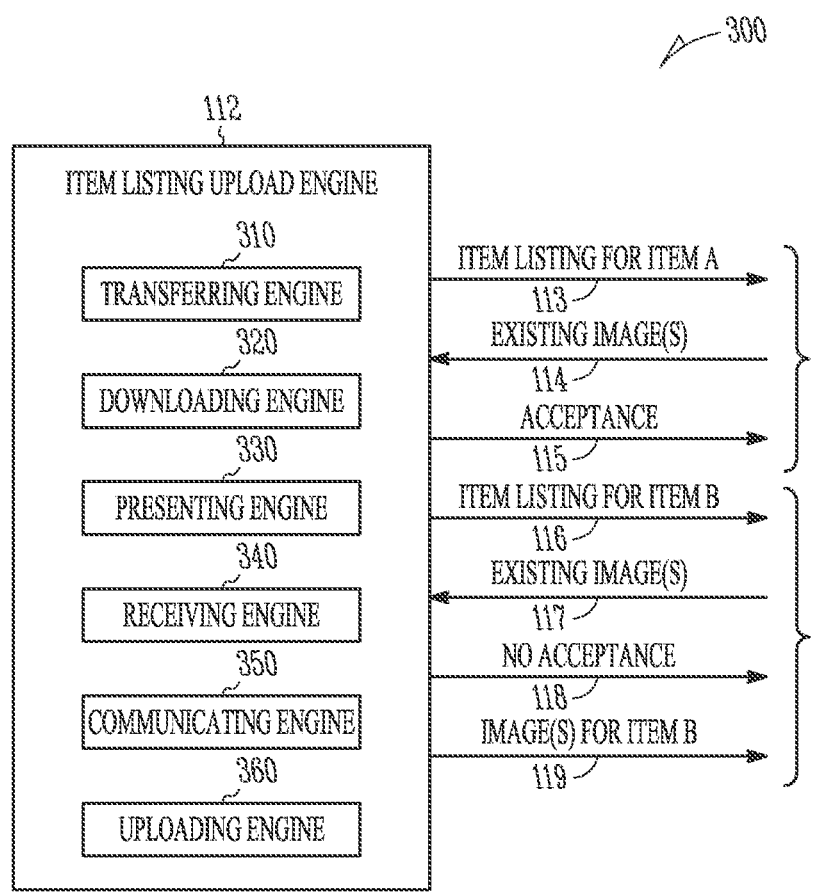
FIG. 3 is a diagram of a computer system for uploading item listings in accordance with an example embodiment.

FIG. 3 is a diagram of a computer system for uploading item listings 300 in accordance with an example embodiment. Illustrated in FIG. 3 is the item listing upload engine 112. The item listing upload engine 112 may include a transferring engine 310, a downloading engine 320, a presenting engine 330, a receiving engine 340 and a communicating engine 350. The transferring engine 310 may receive item listings (e.g., item listing for item A 113 and item listing for item B 116) from a user via a user interface (not shown in FIG. 3), such as a mouse, keyboard, electronic pen, associated with the user device (e.g., 110-1) executing the item listing upload engine 112. In some example embodiments, the item listings 113, 116 may be temporarily stored in the memory unit 111-1 for further processing by the processing unit 111-2. The downloading engine 320 may download a specified number of existing images from the host device 130. The existing images may be ones for which the item listing management engine 132 assigns the highest similarity scores and proposes to the user. Each similarity score may be calculated in the same way as described above using FIG. 2. In some example embodiments, the downloading engine 320 may further receive a designation of the specified number from the user.

The presenting engine 330 may then present the specified number of existing images downloaded from the host device 130 to the user. In presenting, the presenting engine 330 may display a respective existing image proposed to the user along with a corresponding similarity score. The receiving engine 340 may then receive an acceptance of one or more of the specified number of existing images from the user. The communicating engine 350 may then communicate the acceptance received from the user to the host device 130. In some example embodiments, the item listing upload engine 112 may further comprise an uploading engine 360. In such a case, if the specified number of existing images proposed to the user are not accepted 118 by the user, then the uploading engine 360 may further upload one or more images for item B 119 provided by the user to the host device 130 to be associated with the input item listing (e.g., the item listing for item B 116). It is noted that each of the engines described above in FIG. 3 may be implemented by hardware (e.g., circuit), firmware, software or any combinations thereof. It is also noted that although each of the engines is described above as a separate module, the entire engines or some of the engines in FIG. 3 may be implemented as a single entity (e.g., module or circuit) and still maintain the same functionality. It is also noted that when a plurality of images for the item listing are uploaded to the host device 130, the item listing upload engine 112 may similarly reiterate some or entire processes described above for each of the plurality of images for the item listing.

Figure 4:
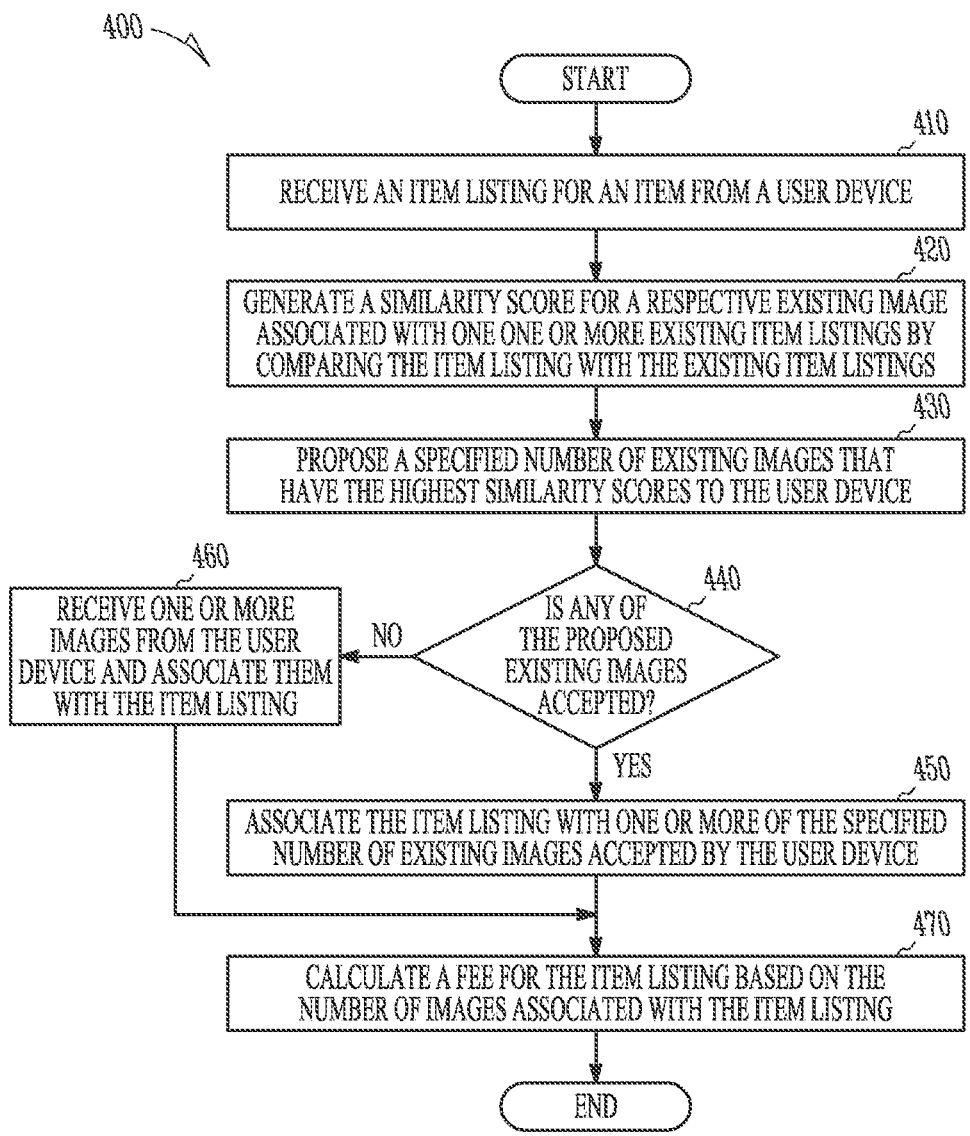
FIG. 4 is a flow chart illustrating a method used to manage item listings in accordance with an example embodiment.

FIG. 4 is a flow chart illustrating a method used to manage item listings 400 in accordance with an example embodiment. At operation 410, an input item listing for an item (e.g., the item listing for item A 113 and the item listing for item B 116) may be received from the user device (e.g., 110-1) to the host device 130. At operation 420, a similarity score may be generated for a respective existing image associated with one or more existing item listings in the host device 130. The similarity score may be calculated by comparing the input item listing with the one or more existing item listings associated with the respective existing image. The similarity score may indicate a degree of similarity between the input item listing and the existing item listings associated with the respective existing image. In some example embodiments, one or more of a title similarity score, a category similarity score and a tag similarity score may be calculated to generate the similarity score for the respective existing image. The title similarity score may be calculated by counting the number of terms in the titles of the one or more existing item listings that match a term in the title of the input item listing. The category similarity score may be calculated by assigning a specified numerical value indicating whether any categories of the one or more existing item listings match the category of the input item listing. The tag similarity score may be calculated by counting the number of tags of the one or more existing item listings that match the tag of the input item listing. In some example embodiments, a weight may be given to one or more of the three sub-similarity scores: the title similarity score, the category similarity score and the tag similarity score. The sub-similarity scores may be combined as a function of a mathematical function (e.g., add) to generate the similarity score. In some example embodiments, the similarity score may be normalized. In some example embodiments, a temporal range or other suitable limitations (e.g., a keyword and/or category limitation) may be applied to reduce the number of existing images for which the similarity score needs to be generated. More detailed explanation about generating the similarity score is given above in FIG. 2.

At operation 430, a specified number of existing images having the highest similarity scores may be selected and proposed to the user. In some example embodiments, the specified number may be designated by the user and received from the user device (e.g., 110-1) via the item listing upload engine 112. In some example embodiments, it may be further checked whether a respective similarity score for the specified number of existing images proposed to the user satisfies a predefined threshold value. In such a case, if none of the similarity scores for the specified number of existing images satisfies the predefined threshold value, a corresponding message is generated and communicated to the user device, for example, via the item listing upload engine 112. At operation 440, it may be checked whether any of the proposed existing images have been accepted by the user. If one or more of the specified number of existing images proposed to the user are accepted by the user, then the control goes to operation 450. At operation 450, the input item listing may be associated with the one or more existing images accepted by the user. If none of the specified number of existing images is accepted by the user, then the control goes to operation 460. At operation 460, one or more images may be received from the user, for example, via the item listing upload engine 112. The images received from the user may then be associated with the input item listing. When the input item listing is associated with one or more proper images, then the control moves to operation 470. At operation 470, a fee for posting the input item listing may then be calculated based on the number of images associated with the input item listing.

Figure 5:
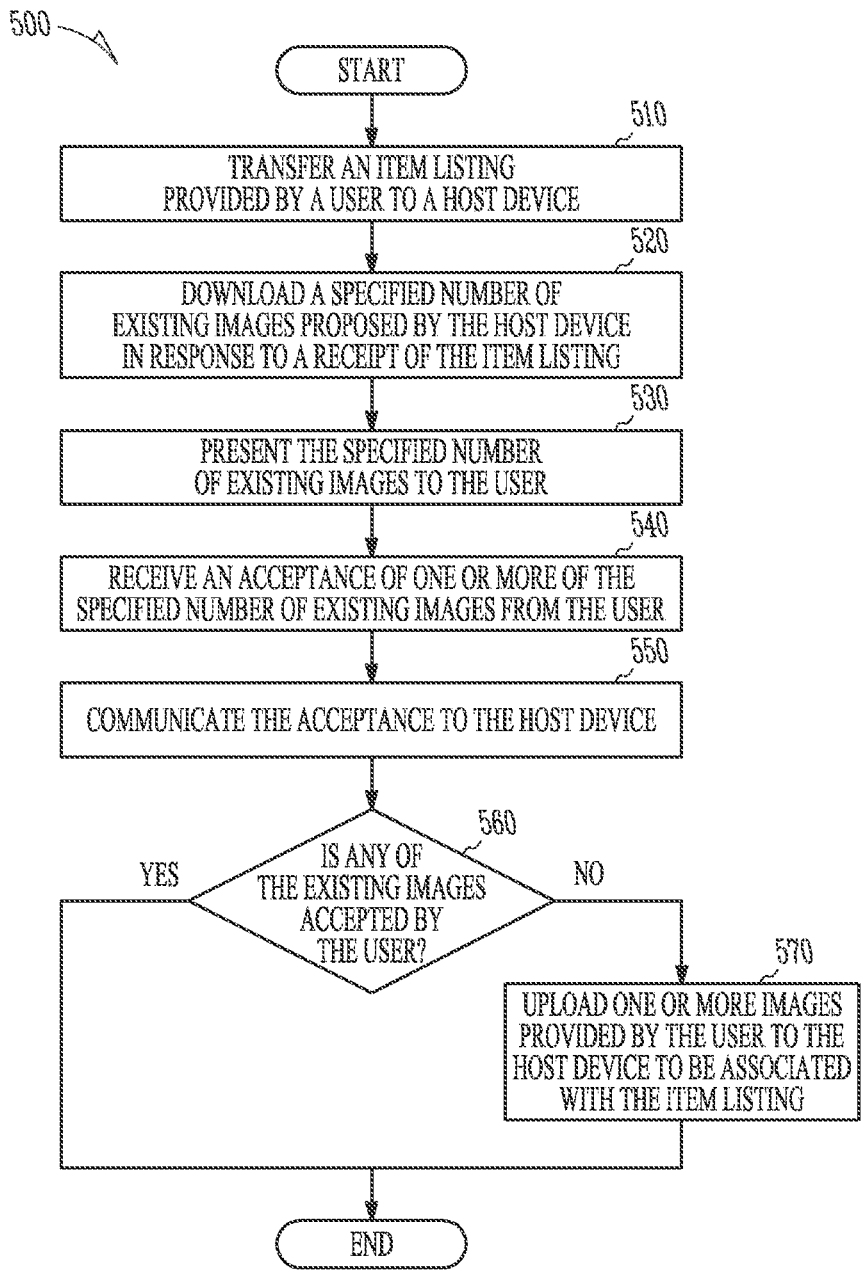
FIG. 5 is a flow chart illustrating a method used to upload item listings in accordance with an example embodiment.

FIG. 5 is a flow chart illustrating a method used to upload item listings 500 in accordance with an example embodiment. At operation 510, an item listing inputted by a user may be transferred to the host device (e.g., 130). In some example embodiments, the host device may be another user device (e.g., 110-2). At operation 520, a specified number of existing images may be downloaded from the host device. The specified number of existing images may be images proposed by the host device in response to a receipt of the input item listing. The specified number of existing images proposed to the user device may be selected based on their similarity scores. As described above in FIGS. 2 and 3, a similarity score for a respective existing image may indicate a degree of similarity between the input item listing and one or more existing item listings in the host device associated with the respective existing image. In some example embodiments, a designation of the specified number may be provided by the user and transferred to the host device. In some example embodiments, a temporal range (e.g., added within 1 week, 1 month, 3 months or 1 year, or Jan. 1, 2007~Dec. 31, 2007, etc.) or other suitable limitations (e.g., a keyword and/or category limitation) may be applied to reduce the number of existing images for which the similarity score needs to be generated in the host device. In such a case, the temporal range or other suitable limitations may be designated by the user and provided to the host device.

At operation 530, the specified number of existing images downloaded from the host device may then be presented to the user. In some example embodiments, a respective proposed existing image may be displayed to the user along with a corresponding similarity score. At operation 540, an acceptance of one or more of the specified number of existing images may be received from the user. At operation 550, the acceptance may be communicated to the host device. At operation 560, it may be checked whether any of the proposed existing images is accepted by the user. If it is determined that none of the proposed existing images is accepted by the user, the control moves to operation 570. At operation 570, one or more images may be provided by the user and transferred to the host device to be associated with the input item listing. When a plurality of images for the input item listing are uploaded to the host device and thus associated with the input item listing, some or all of the methods described above may be similarly reiterated for each of the plurality of images for the input item listing.

Example Database

Some example embodiments may include the various databases (e.g., item listing database 140) being relational databases or in some example cases On Line Analytic Processing (OLAP)-based databases. In the case of relational databases, various tables (e.g., item listing table 260) of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using MDX may be implemented. In the case of a database using tables and SQL, a database application such as, for example, MYSQL™, SQLSERVER™, Oracle 8I™, 10G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

FIG. 6 is a diagram illustrating a data structure for an item listing 600 in accordance with an example embodiment. The item listing may be a detailed description for a corresponding item. Illustrated in FIG. 6 are properties including a serial number 610, a title 620, tags 630, a listing period 640 and an image identifier 650. The tags may include color 632, size 634, status (e.g., new or used) 636, etc. The serial number 610 may indicate the order of the item listing among one or more item listings that are associated with the same image via the same image identifier (e.g., 650). An integer data type may be used for the serial number 610. The title 620 may indicate the item's title (e.g., iPod Nano, Odyssey Putter, etc.). A string data type may be used for the title 620. The tags 630 may be other detailed information about the item, and each tab may be in a form of a pair of an attribute name of the item listing and a value thereof. For example, the color 632 may indicate the item's color and be represented using, for example, a character data type. The size 634 may indicate the item's size (e.g., for memory or housing) and may be represented using, for example, a real number. The status 636 may indicate whether the item is a new or used one and be represented using a character data type. The listing period 640 may indicate a period (e.g., May 13, 2008~Jun. 13, 2008, or 1 day, 2 days, 1 weeks, etc.) for the item listing to be displayed and be represented using, for example, a date data type. In some example embodiments, the listing period 640 may be combined with a time data type to represent an hour and/or minute as well. The image identifier 650 may indicate an identifier of an existing image with which the item listing is associated. In some example embodiments, the image identifier 650 may be generated as a function of a hash algorithm, such as MD5 or SHA-1, etc., and thus may be represented using, for example, an integer data type. More detailed explanation about linking an item listing to an item image via the image identifier is described in U.S. Non-Provisional patent application Ser. No. 12/145,313 entitled "CONSOLIDATING DUPLICATE ITEM IMAGES USING AN IMAGE IDENTIFIER" that was filed on Jun. 24, 2008.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), JavaBeans (JB), Enterprise JavaBeans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, and additionally Asynchronous Transfer Mode (ATM), Systems Network Architecture (SNA), or some other suitable protocol. These networks may be organized within a variety of topologies (e.g., a star topology) or structures.

A Computer System

Figure 7:
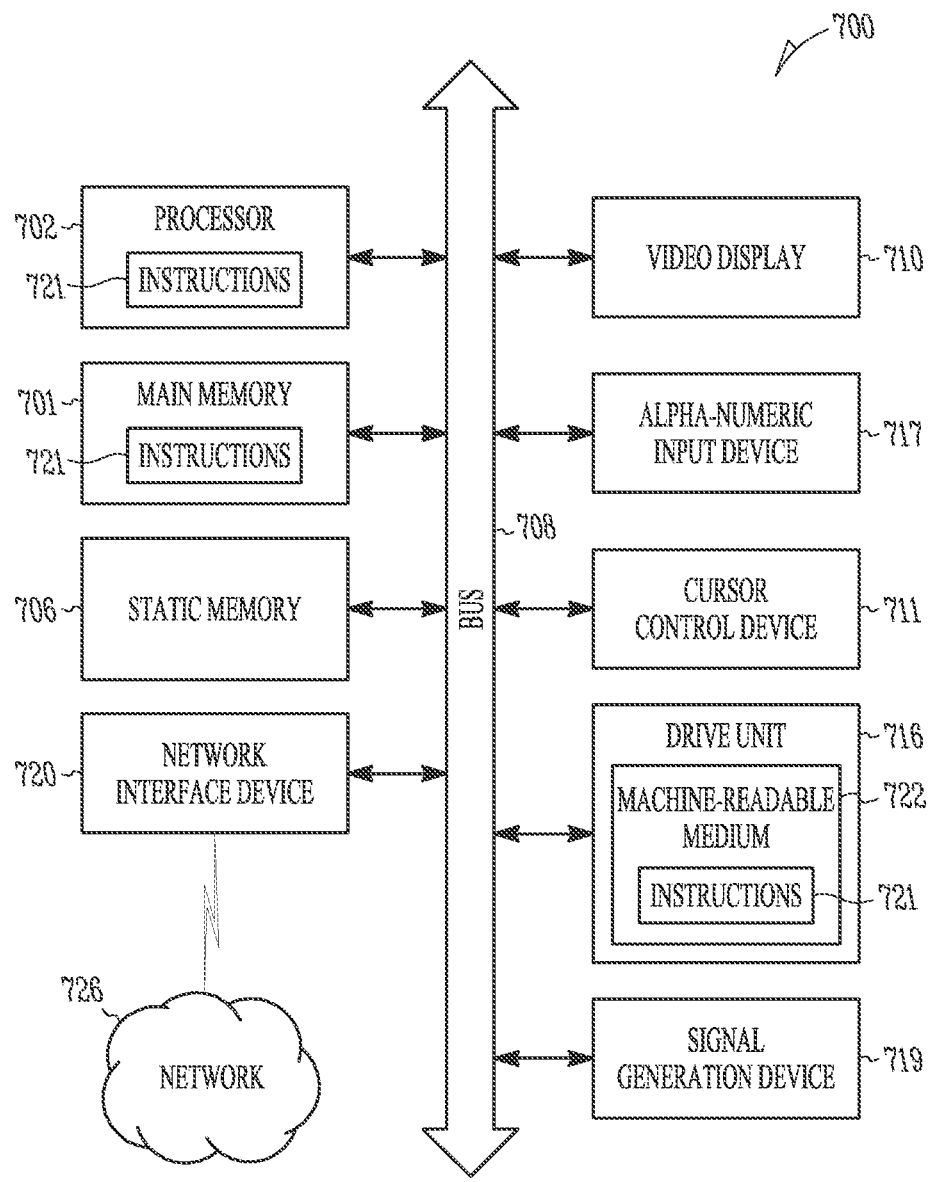
FIG. 7 is a diagram showing an example computer system that executes a set of instructions to perform any one or more of the methodologies discussed herein.

FIG. 7 is a diagram showing an example computer system 700 that executes a set of instructions to perform any one or more of the methodologies discussed herein. In some example embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The computer system 700 includes a processor 702 (e.g., a Central Processing Unit (CPU), a Graphics Processing Unit (GPU) or both), a main memory 701, and a static memory 706, which communicate with each other via a bus 708. The computer system 700 may further include a video display 710 (e.g., a Liquid Crystal Display (LCD) or a Cathode Ray Tube (CRT)). The computer system 700 also includes an alpha-numeric input device 717 (e.g., a keyboard), a User Interface (UI) cursor controller device 711 (e.g., a mouse), a drive unit 716, a signal generation device 719 (e.g., a speaker) and a network interface device (e.g., a transmitter) 720.

The drive unit 716 includes a machine-readable medium 722 on which is stored one or more sets of instructions and data structures (e.g., software) embodying or used by any one or more of the methodologies or functions illustrated herein. The software may also reside, completely or at least partially, within the main memory 701 and/or within the processor 702 during execution thereof by the computer system 700, the main memory 701 and the processor 702 also constituting machine-readable medium 722.

The instructions 721 may further be transmitted or received over a network 726 via the network interface device 720 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

Some example embodiments include a system and method for associating an item listing with one or more corresponding images. The system and method include receiving an item listing for an item from a user device. The item listing may include a title, a category and one or more tags for the item. A respective tag may include a pair of an attribute of the item and a value for the attribute. The system and method include generating a similarity score for a respective existing image associated with one or more existing item listings. The generating may be done by comparing the item listing received from the user device with the existing item listings received from the user device. The similarity score may indicate a degree of similarity between the item listing and the existing item listings associated with the respective existing image. The system and method include proposing a specified number of existing images that have the highest similarity scores to the user device. The system and method further include associating the item listing received from the user device with one or more of the specified number of existing images accepted by the user device.

Some example embodiments include a system and method for selecting one or more item images for an item listing. The system and method include transferring an item listing provided by a user to a host device. The system and method include downloading a specified number of existing images from the host device. The specified number of existing images may be images proposed by the host device in response to a receipt of the item listing transferred to the host device. The system and method include presenting the specified number of existing images to the user. The presenting may include displaying a similarity score for a respective existing image. The similarity score may indicate a degree of similarity between the item listing transferred to the host device and one or more item listings existing in the host device. The system and method include receiving an acceptance of one or more of the specified number of existing images from the user. The system and method further include communicating the acceptance to the host device.

Additional Notes

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be tangibly stored on one or more volatile or non-volatile computer-readable media such as during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above "DETAILED DESCRIPTION" includes references to the accompanying drawings, which form a part of the "DETAILED DESCRIPTION." The drawings show, by way of illustration, specific embodiments of the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A system comprising:
   one or more hardware processors; and
   a non-transitory machine-readable medium for storing instructions that, when executed by the one or more hardware processors of a machine, cause the one or more hardware processors to perform operations comprising:
   receiving an input item listing for an item from a user device, the input item listing including a tag for the item, the tag including a pair of an attribute of the item and a value for the attribute;
   accessing an existing image, the existing image being associated with one or more existing item listings;
   generating a category similarity score that indicates a degree of similarity between a category of the input item listing and one or more categories of the one or more existing item listings;
   generating a similarity score for the existing image based on the category similarity score that indicates the degree of similarity between the category of the input item listing and the one or more categories of the one or more existing item listings, the generating of the similarity score including calculating a tag similarity score by counting a number of tags of each of the one or more existing item listings that match a respective tag of the input item listing;

selecting one or more existing images corresponding to the one or more existing item listings based on the one or more existing images having corresponding similarity scores that exceed a threshold value; and transmitting a communication to the user device in response to the receiving of the input item listing, the communication including the one or more existing images.

2. The system of claim 1, wherein the calculating of the tag similarity score comprises determining a percentage value that indicates the number of tags of each of the one or more existing listings that match the respective tag of the item listing.

3. The system of claim 1, wherein the operations further comprise:
receiving, from the user device, an acceptance of a particular existing image of the one or more existing images; and
associating the input item listing with the accepted particular existing image based on the received acceptance.

4. The system of claim 3, wherein the operations further comprise:
storing the input item listing associated with the accepted particular existing image, in a database, as a new item listing for the accepted particular existing image.

5. The system of claim 1, wherein the operations further comprise:
identifying, based on one or more data structures of the one or more existing item listings, the existing image associated with one or more existing item listings, for which to generate the similarity score.

6. The system of claim 1, wherein the operations further comprise:
uploading an image corresponding to the input item listing, the image being provided by the user device in response to the transmitting of the communication to the user device; and associating the input item listing with the image provided by the user device.

7. A method comprising:
receiving an input item listing for an item from a user device, the input item listing including a tag for the item, the tag including a pair of an attribute of the item and a value for the attribute;
accessing an existing image, the existing image being associated with one or more existing item listings;
generating a category similarity score that indicates a degree of similarity between a category of the input item listing and one or more categories of the one or more existing item listings;
generating a similarity score for the existing image based on the category similarity score that indicates the degree of similarity between the category of the input item listing and the one or more categories of the one or more existing item listings, the generating of the similarity score including calculating a tag similarity score by counting a number of tags of each of the one or more existing item listings that match a respective tag of the input item listing;

selecting one or more existing images corresponding to the one or more existing item listings based on the one or more existing images having corresponding similarity scores that exceed a threshold value; and transmitting a communication to the user device in response to the receiving of the input item listing, the communication including the one or more existing images.

8. The method of claim 7, wherein the calculating of the tag similarity score comprises determining a percentage value that indicates the number of tags of each of the one or more existing listings that match the respective tag of the item listing.

9. The method of claim 7, further comprising:
receiving, from the user device, an acceptance of a particular existing image of the one or more existing images; and
associating the input item listing with the accepted particular existing image based on the received acceptance.

10. The method of claim 9, further comprising:
storing the input item listing associated with the accepted particular existing image, in a database, as a new item listing for the accepted particular existing image.

11. The method of claim 7, further comprising:
identifying, based on one or more data structures of the one or more existing item listings, the existing image associated with one or more existing item listings, for which to generate the similarity score.

12. The method of claim 7, further comprising:
uploading an image corresponding to the input item listing, the image being provided by the user device in response to the transmitting of the communication to the user device; and associating the input item listing with the image provided by the user device.

13. A non-transitory machine-readable storage medium comprising instructions that, when executed by one or more hardware processors of a machine, cause the machine to perform operations comprising:
receiving an input item listing for an item from a user device, the input item listing including a tag for the item, the tag including a pair of an attribute of the item and a value for the attribute;
accessing an existing image, the existing image being associated with one or more existing item listings;
generating a category similarity score that indicates a degree of similarity between a category of the input item listing and one or more categories of the one or more existing item listings;
generating a similarity score for the existing image based on the category similarity score that indicates the degree of similarity between the category of the input item listing and the one or more categories of the one or more existing item listings, the generating of the similarity score including calculating a tag similarity score by counting a number of tags of each of the one or more existing item listings that match a respective tag of the input item listing;
selecting one or more existing images corresponding to the one or more existing item listings based on the one or more existing images having corresponding similarity scores that exceed a threshold value; and
transmitting a communication to the user device in response to the receiving of the input item listing, the communication including the one or more existing images.

14. The non-transitory machine-readable storage medium of claim 13, wherein the calculating of the tag similarity score comprises determining a percentage value that indicates the number of tags of each of the one or more existing listings that match the respective tag of the item listing.

15. The non-transitory machine-readable storage medium of claim 13, wherein the operations further comprise:
   receiving, from the user device, an acceptance of a particular existing image of the one or more existing images; and
   associating the input item listing with the accepted particular existing image based on the received acceptance.

16. The non-transitory machine-readable storage medium of claim 15, wherein the operations further comprise:
   storing the input item listing associated with the accepted particular existing image, in a database, as a new 7 item listing for the accepted particular existing image.

17. The non-transitory machine-readable storage medium of claim 13, wherein the operations further comprise:
   uploading an image corresponding to the input item listing, the image being provided by the user device in response to the transmitting of the communication to the user device, and associating the input item listing with the image provided by the user device.

* * * * *

UNITED STATES PATENT AND TRADEMARK OFFICE
CERTIFICATE OF CORRECTION

PATENT NO. : 9,727,615 B2  
APPLICATION NO. : 14/950843  
DATED : August 8, 2017  
INVENTOR(S) : Xiaoyuan Wu et al.

It is certified that error appears in the above-identified patent and that said Letters Patent is hereby corrected as shown below:

In the Specification

In Column 1, Line 18, delete "Aug. 16," and insert -- Apr. 16, --, therefor.

In the Claims

In Column 15, Line 59, in Claim 7, delete "generating" and insert -- generating, using one or more hardware processors, --, therefor.

In Column 17, Line 17, in Claim 16, after "new" delete "7".

In Column 17, Line 24, in Claim 17, delete "device," and insert -- device; --, therefor.

Signed and Sealed this
Twenty-sixth Day of June, 2018

Andrei Iancu
*Director of the United States Patent and Trademark Office*